United States Patent
Ogawa et al.

(10) Patent No.: US 10,739,760 B2
(45) Date of Patent: Aug. 11, 2020

(54) CONTROL SYSTEM

(71) Applicant: FANUC CORPORATION, Minamitsuru-gun, Yamanashi (JP)

(72) Inventors: Shinya Ogawa, Yamanashi (JP); Akira Kanemaru, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 29 days.

(21) Appl. No.: 16/055,356

(22) Filed: Aug. 6, 2018

(65) Prior Publication Data

US 2019/0049934 A1 Feb. 14, 2019

(30) Foreign Application Priority Data

Aug. 10, 2017 (JP) .................. 2017-155467

(51) Int. Cl.
G05B 19/418 (2006.01)
G05B 19/408 (2006.01)
G05B 19/414 (2006.01)

(52) U.S. Cl.
CPC ... G05B 19/41815 (2013.01); G05B 19/4083 (2013.01); G05B 19/414 (2013.01); G05B 19/4185 (2013.01); G05B 19/41835 (2013.01); G05B 2219/31422 (2013.01); G05B 2219/35373 (2013.01)

(58) Field of Classification Search
CPC .......... G05B 19/41815; G05B 19/4185; G05B 19/41835; G05B 19/414; G05B 19/4083; G05B 2219/31422; G05B 2219/35373
See application file for complete search history.

(56) References Cited

U.S. PATENT DOCUMENTS

| | | | |
|---|---|---|---|
| 2010/0256794 A1 | 10/2010 | McLaughlin et al. | |
| 2016/0091889 A1 | 3/2016 | Nakajima et al. | |
| 2016/0376098 A1 | 12/2016 | Inoue | |
| 2017/0235294 A1* | 8/2017 | Shapiro ............. | B23K 26/0876 |
| | | | 700/97 |

FOREIGN PATENT DOCUMENTS

| | | |
|---|---|---|
| JP | 2001310244 A | 11/2001 |
| JP | 2006107167 A | 4/2006 |
| JP | 2012523041 A | 9/2012 |
| JP | 2016-071407 A | 5/2016 |
| JP | 2017-016233 A | 1/2017 |

OTHER PUBLICATIONS

Notice of Reasons for Refusal for Japanese Application No. 2017-155467, dated Aug. 27, 2019, with translation, 4 pages.

* cited by examiner

*Primary Examiner* — Christopher E. Everett
(74) *Attorney, Agent, or Firm* — RatnerPrestia

(57) ABSTRACT

A control system constructed so that a machine tool and a high-order server configured to manage the machine tool are connected through a communication line determines the arrangement of a control process in the respective execution environments of the machine tool and the high-order server, based on an execution condition for the execution of the control process available in machining performed in the machine tool and machining information on the machining in the machine tool.

2 Claims, 6 Drawing Sheets

FIG.3

CONTROL PROCESS MANAGEMENT TABLE

| CONTROL PROCESS ID | COMMUNICATION CONTROL | COMMUNICATION TRAFFIC (KB/s) | COMMUNICATION BUFFER USED(MB) |
|---|---|---|---|
| P01 | IMPOSSIBLE | - | - |
| P02 | IMPOSSIBLE | - | - |
| P03 | POSSIBLE | 512 | 8MB |
| P04 | POSSIBLE | 128 | 512KB |
| P05 | POSSIBLE | 32 | 1MB |

FIG.4

MACHINING MANAGEMENT TABLE

| MACHINE TOOL ID | MACHINING SHAPE | CONTROL PROCESS | COMMUNICATION CAPABILITY (Gbps) |
|---|---|---|---|
| M01 | A | P01, ~~P02~~, P03, ~~P04~~, ~~P05~~ | 1 |
| M02 | B | P01, P02, P03, P04, ~~P05~~ | 1 |
| M03 | C | P01, ~~P02~~, P03, P04, P05 | 1 |

FIG.5

CONTROL PROCESS ARRANGEMENT TABLE

| CONTROL PROCESS ID | COMMUNICATION CONTROL | CONTROL PROCESS USED | | | EXECUTION ENVIRONMENT | | | |
|---|---|---|---|---|---|---|---|---|
| | | M01 | M02 | M03 | HIGH-ORDER SERVER | M01 | M02 | M03 |
| P01 | IMPOSSIBLE | O | O | O | — | O | O | O |
| P02 | IMPOSSIBLE | — | O | — | — | — | O | — |
| P03 | POSSIBLE | O | O | O | O | — | — | — |
| P04 | POSSIBLE | — | O | O | O | — | — | — |
| P05 | POSSIBLE | — | — | O | O | — | — | — |

FIG.7

| MACHINING MANAGEMENT TABLE | | | | | 121 |
|---|---|---|---|---|---|
| MACHINE TOOL ID | MACHINING SHAPE | CONTROL PROCESS | COMMUNICATION CAPABILITY (Gbps) | LATENCY | |
| M01 | A | P01, ~~P02~~, P03, ~~P04~~, ~~P05~~ | 1 | LOW | |
| M02 | B | P01, P02, P03, P04, ~~P05~~ | 1 | LOW | |
| M03 | C | P01, ~~P02~~, P03, P04, P05 | 1 | HIGH | |

FIG.8

| CONTROL PROCESS ARRANGEMENT TABLE | | | | | | | | |
|---|---|---|---|---|---|---|---|---|
| CONTROL PROCESS ID | COMMUNICATION CONTROL | CONTROL PROCESS USED | | | EXECUTION ENVIRONMENT | | | |
| | | M01 | M02 | M03 | HIGH-ORDER SERVER | M01 | M02 | M03 |
| P01 | IMPOSSIBLE | ○ | ○ | ○ | — | ○ | ○ | ○ |
| P02 | IMPOSSIBLE | — | ○ | — | — | — | ○ | — |
| P03 | POSSIBLE | ○ | ○ | ○ | ○ | — | — | — |
| P04 | ▲ | — | ○ | ○ | ○ | — | — | ○ |
| P05 | POSSIBLE | — | — | ○ | ○ | — | — | — |

CONTROL SYSTEM

CROSS-REFERENCE TO RELATED APPLICATION

This application is a new U.S. Patent Application that claims benefit of Japanese Patent Application No. 2017-155467, filed Aug. 10, 2017, the disclosure of this application is being incorporated herein by reference in its entirety for all purposes.

BACKGROUND OF THE INVENTION

Field of the Invention

The present invention relates to a control system, and more particularly, to a control system capable of executing a control process in an optimal environment.

Description of the Related Art

Conventionally, as regards various types of machine tools such as lathes, grinders, and machining centers, processes for implementing various functions have been developed and used to be expansively installed in the individual machine tools according to diversified uses and purposes. These processes include, for example, a preprocessing process for generating execution form data from a machining program in advance, a basic screen process for displaying basic information on machining, a tool management process for managing tools attached to the machine tools, and the like.

As these various processes are additionally installed in general-purpose machine tools, it is necessary to install a large-capacity memory for expanding these processes and a high-performance CPU for executing these processes, resulting in a cost increase of the machine tools. Moreover, in performing the machining by using a plurality of machine tools, an operator must operate an input device to achieve setting while observing the respective screens of the machine tools despite the sameness of the setting, thereby causing a reduction in work efficiency.

On the other hand, with the recent development of network technologies, there are increasing systems in which machine tools in a factory are connected to a high-order server such as a host computer or a cell computer and run in response to machining instructions or control commands from the high-order server. Moreover, there are also forms, such as cloud systems, in which control processes are executed on a server and the results of the execution are used in the machine tools.

In these circumferences, Japanese Patent Application Laid-Open No. 2016-071407 discloses a technique in which some of necessary processes for the operation of a machine tool are operated on a host computer. In operating the machine tool, according to this technique, necessary information is exchanged between the host computer and the machine tool through a network as the some of the processes are operated on the host computer and other processes are operated on the machine tool. Moreover, Japanese Patent Application Laid-Open No. 2017-016233 discloses a technique in which a non-volatile memory of a numerical controller and an external storage device of a server are selected as storage destinations of machining programs in the numerical controller, depending on the necessity of high-speed reading.

Even if the technique disclosed in Japanese Patent Application Laid-Open No. 2016-071407 is used, however, only the specific processes are fixedly arranged on the server, so that all the other processes are resident in the machine tool. Therefore, even unnecessary processes for production planning are resident without exception in the machine tool, so that there remains a problem that the unnecessary processes compress a memory or induce a reduction in performance.

Although a technique for selecting an optimal storage location of a machining program created by a user is disclosed in Japanese Patent Application Laid-Open No. 2017-016233, on the other hand, the machining program is machining data that is used to generate the amount of movement of an axis by a basic-axis control process or the like after being converted into execution form data by a preprocessing process. Specifically, the machining program, unlike those processes which are resident on a RAM as they are executed, is handled as temporary data for controlling the axis. Accordingly, although the optimal storage location of the machining program can be selected, it is impossible to suppress the memory capacity for expanding the processes or reduce the rate of CPU usage by the processes.

Furthermore, in the case where a plurality of machine tools are used for simultaneous operation, all the machine tools do not always share the same capability, use, or purpose. Therefore, if the latency of communication is high due to the performance of a communication interface, for example, even those processes which can be executed on the host computer sometimes should be executed on the machine tools, and it is not always advisable to operate specific processes on the host computer.

SUMMARY OF THE INVENTION

The present invention has been made to solve the above problems and its object is to provide a control system capable of executing a control process in an optimal environment.

The control system of the present invention comprises a high-order server and a plurality of machine tools and solves the above problems by providing the high-order server with a process execution environment determination mechanism, which is configured to determine any of a high-order server and a machine tool which should execute the control process required in operation of the plurality of machine tool, from the point of view of efficiency of an entire system, and determining, by the process execution environment determination mechanism, optimal execution environments for the control processes, based on information input from a production planning device or the like.

A control system according to an aspect of the present invention is constructed so that at least one machine tool and a high-order server configured to manage the machine tool are connected through a communication line, and comprises a control process management unit configured to manage an execution condition for the execution of a control process available in machining performed in the machine tool, a machining management unit configured to manage machining information on the machining in the machine tool, and a control process arrangement unit configured to determine the arrangement of the control process in the respective execution environments of the machine tool and the high-order server, based on the execution condition managed by the control process management unit and the machining information managed by the machining management unit.

The machining management unit may be configured to manage a factor related to the execution environment to be considered in arranging the control process, and the control process arrangement unit may be configured to determine the arrangement of the control process in the respective execution environments of the machine tool and the high-order server, based on the execution condition managed by the control process arrangement unit and the factor related to the execution environment managed by the machining management unit.

A high-order server according to another aspect of the present invention is configured to manage at least one machine tool through a communication line, and comprises a control process management unit configured to manage an execution condition for the execution of a control process available in machining performed in the machine tool, a machining management unit configured to manage machining information on the machining in the machine tool, and a control process arrangement unit configured to determine the arrangement of the control process in the respective execution environments of the machine tool and the high-order server, based on the execution condition managed by the control process management unit and the machining information managed by the machining management unit.

According to the present invention, an optimal process arrangement can be determined according to the capability, use, and purpose of each machine tool, so that highly efficient process execution can be achieved to reduce the cost of the entire system.

BRIEF DESCRIPTION OF THE DRAWINGS

FIG. 3 is a diagram showing an example of a control process management table;

FIG. 4 is a diagram showing an example of a machining management table;

FIG. 5 is a diagram showing an example of a control process arrangement table;

FIG. 7 is a diagram showing another example of the machining management table;

FIG. 8 is a diagram showing another example of the control process arrangement table.

DETAILED DESCRIPTION OF THE PREFERRED EMBODIMENTS

Figure 1:
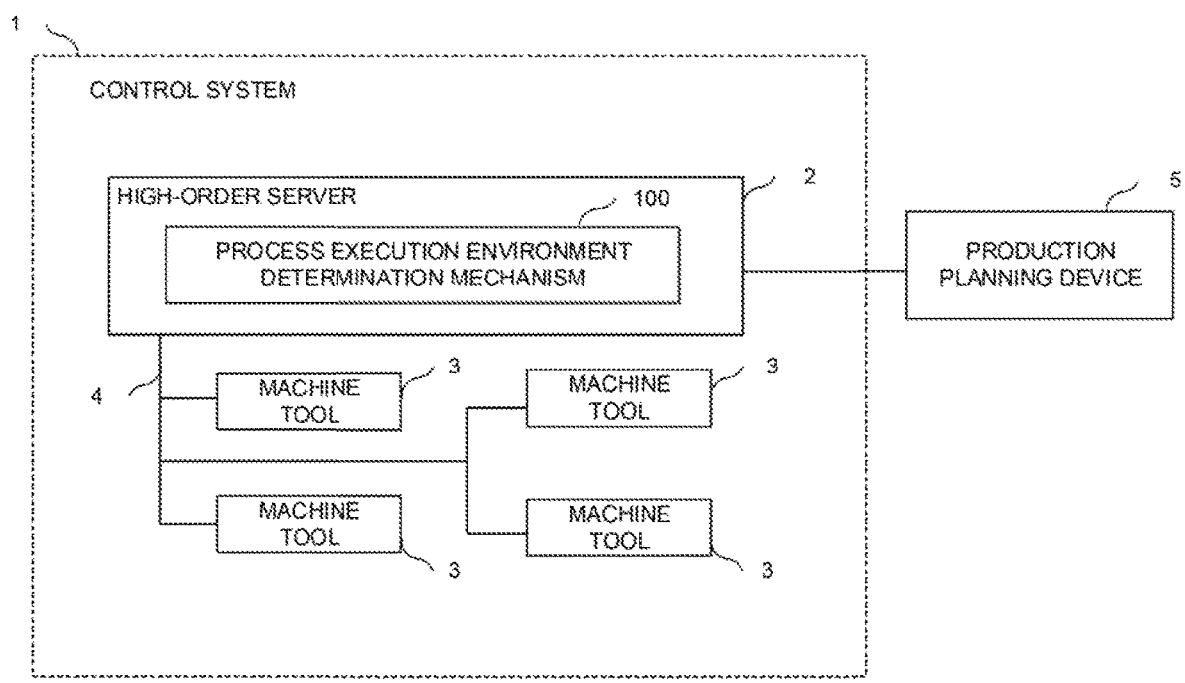
FIG. 1 is a block diagram showing a configuration of a control system according to an embodiment of the present invention.

An embodiment of the present invention will now be described with reference to the accompanying drawings. First, the overall structure of a control system 1 according to the embodiment of the present invention will be described with reference to the block diagram of FIG. 1.

The control system 1 is constructed in such a manner that the high-order server 2 and at least one machine tool 3 are connected by a wired/wireless communication line 4.

The high-order server 2 can be constructed as a server device, such as a host computer or a cell controller, for managing the at least one machine tool 3. Based on a production plan or the like received from a production planning device 5 or the like, for example, the high-order server 2 assigns tasks related to workpiece machining to the machine tools 3 under the control of the high-order server 2 and commands the machine tools 3 to perform the tasks through the communication line 4. The high-order server 2 of the present embodiment comprises a process execution environment determination mechanism 100 configured to determine an optimal execution environment for a control process according to the assignment of the tasks to the individual machine tools 3.

The machine tools 3 include a lathe, grinder, and machining center that machine a workpiece based on a command from the high-order server 2. The machine tool 3 performs a task related to workpiece machining assigned by the high-order server 2, based on the command from the high-order server 2. The machine tool 3 may be a single machine or a set of machines including peripheral equipment such as a robot.

Figure 2:
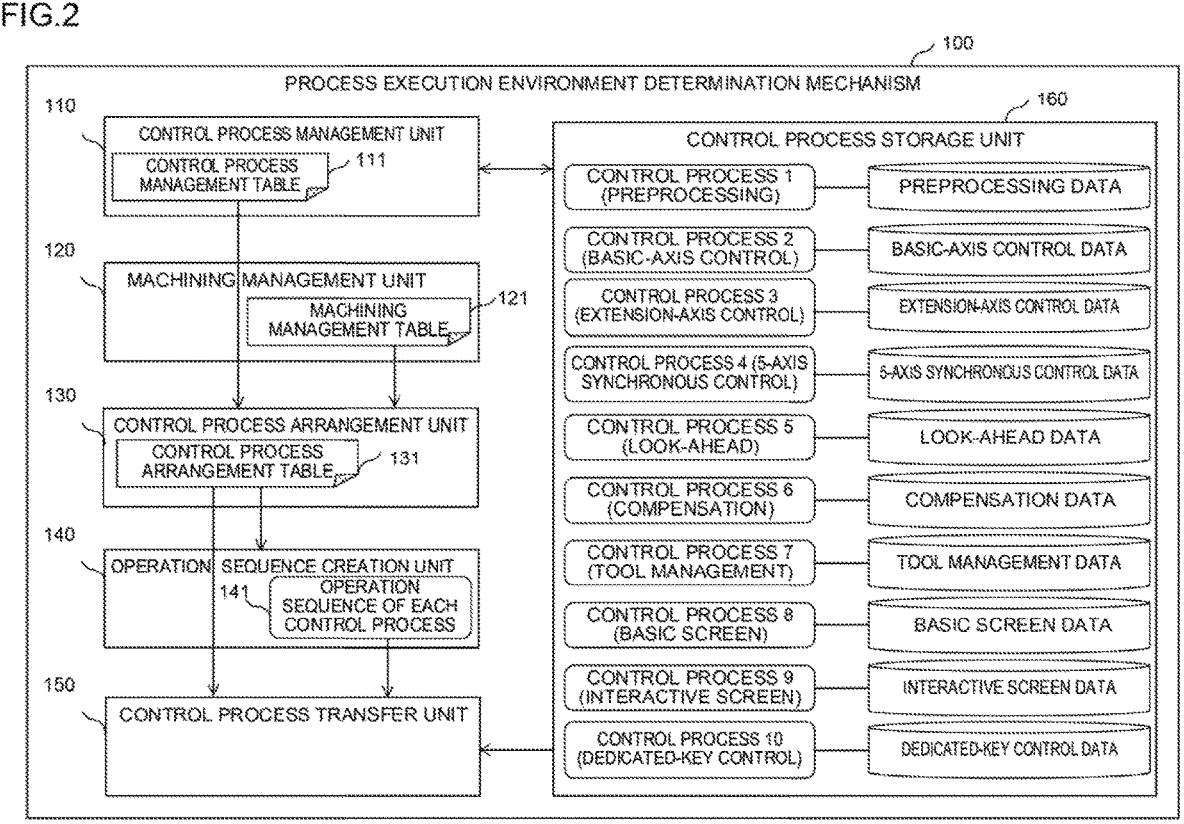
FIG. 2 is a block diagram showing a configuration of a process execution environment determination mechanism.

FIG. 2 is a schematic block diagram of the process execution environment determination mechanism 100.

The process execution environment determination mechanism 100 comprises a control process management unit 110, machining management unit 120, control process arrangement unit 130, operation sequence creation unit 140, control process transfer unit 150, and control process storage unit 160. The above individual functional means of the process execution environment determination mechanism 100 are implemented as a CPU of the high-order server 2 reads out and executes system programs stored in a memory such as a ROM or a RAM, thereby controlling various parts of the high-order server 2.

The control process management unit 110 creates a control process management table 111, which is a table on which information on all necessary control processes for the tasks related to the workpiece machining commanded to the machine tools 3 is listed. This control process management unit 110 reads out data on the control processes previously registered in the control process storage unit 160 and creates the control process management table 111 based on the read data on the control processes.

FIG. 3 is a diagram showing the control process management table 111 created by the control process management unit 110.

As shown in FIG. 3, information on each control process is registered in the control process management table 111. The information on each control process includes a control process ID capable of uniquely identifying the control process and an execution condition for executing the control process. This execution condition may be, for example, information indicative of whether or not communication control can be performed through the communication line (for example, the communication control is impossible in a basic-axis control process or an extension-axis control process because a delay or the like of processing is not allowed therein (P01, P02, etc., in FIG. 3), whereas the communication control is possible in a look-ahead process, preprocessing process, basic screen process, or interactive screen process (P03, P04, P05, etc., in FIG. 3). Moreover, the execution condition may include information on a communication traffic generated as the control process concerned is controlled through the communication line, the size of a communication buffer required for the communication control, and the like. Furthermore, the execution condition may include information indicating that the control process concerned is a user interface or a response preference process. The execution conditions for the individual control processes should only be stored as data on the control processes in the control process storage unit 160 in advance.

The machining management unit 120 is a functional means for creating a machining management table 121 on which tasks related to the workpiece machining assigned to the individual machine tools 3 are listed. Information related to the machining that includes information on the necessary control process for the machining performed by each of the machine tools is registered in the machining management table 121 created by the machining management unit 120. The machining management unit 120 creates the information related to the machining registered in the machining management table 121, based on, for example, information such as the production plan input from the production planning device 5 and information acquired from each machine tool 3 under the control of the machining management unit 120.

FIG. 4 is a diagram showing an example of the machining management table 121 created by the machining management unit 120.

In the example shown in FIG. 4, the information on the machining performed by each machine tool is registered in the machining management table 121. The information on each machining operation includes a machine tool ID for unique identification of the machine tool and a control process used in the machining by the machine tool. Moreover, the information on the machining may further include information indicative of a machining shape for the machining performed by the machine tool, information indicative of the communication capability of the machine tool, information on a memory (communication buffer, etc.) of the machine tool, and the like, as factors related to execution environments to be considered in determining the arrangement of the execution environments of the control process.

The control process arrangement unit 130 creates a control process arrangement table 131 which determines, based on the control process management table 111 created by the control process management unit 110 and the machining management table 121 created by the machining management unit 120, any of the high-order server 2 and each machine tool 3 on which each control process registered in the control process management table 111 should be arranged (or by which each control process registered in the control process management table 111 should be executed). The control process arrangement unit 130 determines a device (the high-order server 2 or the machine tools 3) that executes the control processes according to a predetermined rule, based on the control process management table 111 and the machining management table 121. This predetermined rule may be, for example, a rule by which a control process not enabling a communication control should be executed on the machine tool 3 that uses the control process or a rule by which a control process enabling a communication control should be executed on the high-order server 2 as far as possible. Moreover, the predetermined rule may be a rule compatible with the nature of each control process, e.g., a rule by which a control process related to the user interface should be executed on the high-order server as long as the processing capacity of the high-order server permits (i.e., a rule for reduction in the operator's labor intensity by the arranging the user interface in the high-order server). Furthermore, the arrangement of the control process may be determined by using a rule by which the control process should be arranged in consideration of memory amount, processing capacity, and execution load installed in the high-order server 2 or the machine tools 3 or a rule by which the control process should be arranged in consideration of the communication traffic and a communication buffer.

FIG. 5 is a diagram showing an example of the control process arrangement table 131 created by the control process arrangement unit 130.

In the example shown in FIG. 5, for each control process, information on whether or not the communication control is possible and information on the machine tool (represented in FIG. 5 by the machine tool ID registered in the machining management table 121 of FIG. 4) using the control process and the execution environment for executing the control process are registered in association with one another in the control process arrangement table 131. The control process arrangement table 131 shown in FIG. 5 determines an execution environment of the control process according to any of the rules described above as examples, based on information related to the possibility of the communication control specified based on the control process management table 111 illustrated in FIG. 3 and information on the machine tool using the control process specified based on the machining management table 121 illustrated in FIG. 4 (since the communication control is impossible in the control process P01, for example, this control process P01 has to be executed on the machine tool that uses the control process P01, as a result, machine tools M01 to M03 are assumed to be execution environments).

The operation sequence creation unit 140 creates an operation sequence for controlling the exchange of the control process that is expected to be exchanged between the high-order server and the machine tool, for each of the control processes registered in the control process arrangement table 131 created by the control process arrangement unit 130. The operation sequence creation unit 140 creates the operation sequence for controlling exchange of the control process, set to be executed on the high-order server in the control process arrangement table 131, between the high-order server and the machine tool at time of execution of the control process, based on the data on the control processes previously stored in the control process storage unit 160. In the example of the control process arrangement table 131 illustrated in FIG. 5, for the control processes P03 to P05 to be executed on the high-order server, an operation sequence for controlling the exchange of control process between the machine tools M01 to M03 is required. For operation sequences, the template of the operation sequence may be previously stored for each control process, as data on each control process, in the control process storage unit 160. In that case, the operation sequence creation unit 140 may modify the template so as to comply with the execution environment.

The control process transfer unit 150 transfers the control processes to the individual execution environments according to the control process arrangement table 131 and transfers the operation sequence created by the operation sequence creation unit 140 to the execution environments in which the operation sequence is used. The control processes transferred to the execution environments by the control process transfer unit 150 may be the control processes (programs) previously stored in the control process storage unit 160.

Figure 6:
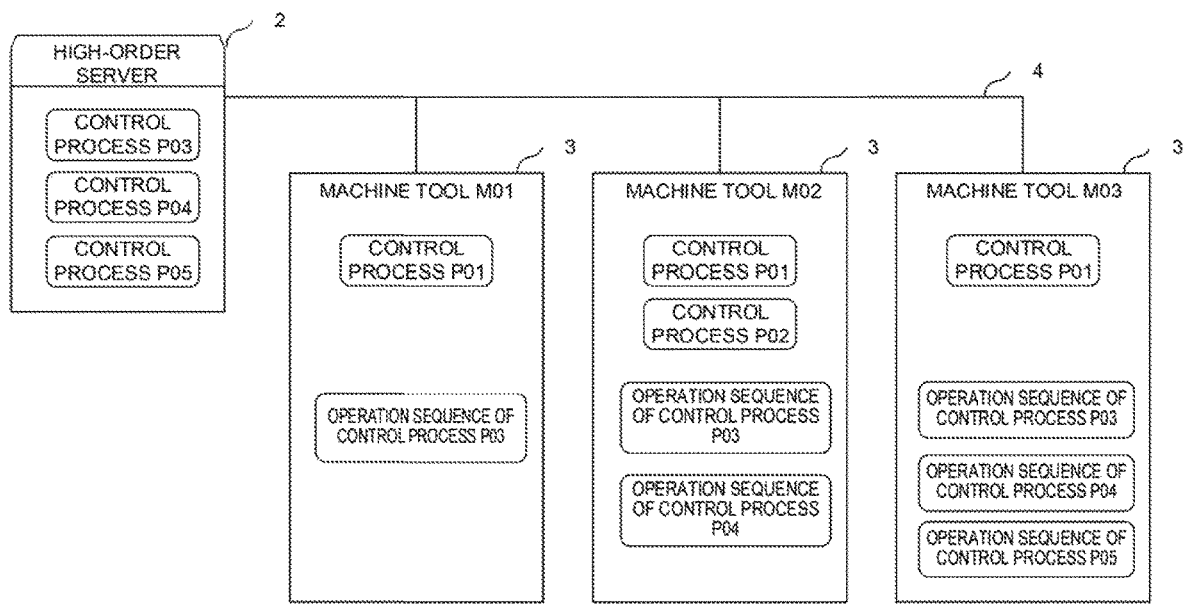
FIG. 6 is a diagram showing an arrangement example of control processes.

FIG. 6 is a diagram showing an example in which the control processes and the operation sequences are transferred to the individual execution environments (the high-order server 2 and the machine tools 3) based on the tables illustrated in FIGS. 3 to 5.

According to the embodiment described above, the process execution environment determination mechanism 100 can implement an optimal arrangement of the control process for the machining tasks based on the possibility of the communication control for each control process.

The factors related to the execution environments to be considered in determining the arrangement of the control process may be supposed to include the latency of communication, as well as the possibility of communication control for each control process, communication traffic, communication buffer amount, and the like. In general, there are various disturbances in factory environments, so that only a specific machine tool may be subject to high latency of communication due to the influence of noise or the like. In such a case, for machine tools with high latency of communication with the high-order server, it may be advisable to change the arrangement of the control process, as compared with other machine tools.

FIG. 7 shows an example of the machining management table 121 that is created based on the result of measurement of latency in a communication test conducted for each machine tool through the high-order server.

Figure 9:
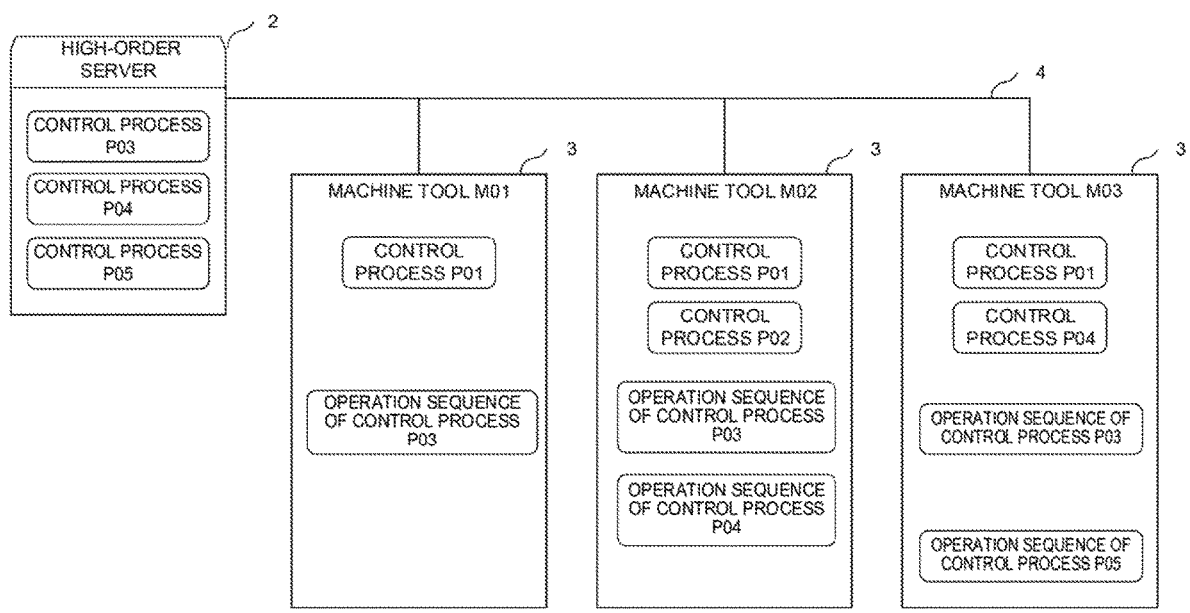
FIG. 9 is a diagram showing another arrangement example of the control processes.

As illustrated in FIG. 7, it is assumed here that the latency of communication with the high-order server is low for the machine tools M01 and M02 and high for the machine tool M03. In this case, as shown in FIG. 5, although the communication control is originally possible in the control process P04, the operator may possibly feel stressed from the delay of operation of the control process which is caused by congestion in the communication in case where the latency is high. Thereupon, the control process arrangement unit 130 creates the control process arrangement table 131 shown in FIG. 8 and transfers the control process P04 also to the machine tool M03, thereby arranging the control process so as to remove the influence of the latency (FIG. 9). Thus, various environment factors for the arrangement of the control system 1 can be used as the factors related to the execution environments to be considered in order to determine the arrangement of the execution environments of the control process.

The present invention is not limited to the above-described embodiment and may be suitably modified without departing from the spirit of the invention. Any of the constituent elements of the embodiment may be modified or omitted without departing from the scope of the invention.

The invention claimed is:

1. A control system constructed so that at least one machine tool and a high-order server configured to manage the machine tool are connected through a communication line, the control system comprising:
   a control process management unit configured to manage an execution condition for the execution of a control process available in machining performed in the machine tool;
   a machining management unit configured to manage machining information on the machining in the machine tool, wherein the machining information includes information on a factor related to an execution environment to be considered in arranging the control process; and
   a control process arrangement unit configured to determine the arrangement of the control process in the respective execution environments of the machine tool and the high-order server, wherein the arrangement is based on the execution condition managed by the control process management unit and the factor related to the execution environment included in the machining information managed by the machining management unit, wherein
   the factor related to the execution environment includes at least one of communication traffic, size of a communication buffer, and latency of communication, and
   the execution condition includes a rule considering at least one of memory amount, processing capacity and execution load installed in the high-order server or the machine tool.

2. A high-order server configured to manage at least one machine tool through a communication line, the high-order server comprising:
   a control process management unit configured to manage an execution condition for the execution of a control process available in machining performed in the machine tool;
   a machining management unit configured to manage machining information on the machining in the machine tool, wherein the machining information includes information on a factor related to an execution environment to be considered in arranging the control process; and
   a control process arrangement unit configured to determine the arrangement of the control process in the respective execution environments of the machine tool and the high-order server, based on the execution condition managed by the control process management unit and the factor related to the execution environment included in the machining information managed by the machining management unit, wherein
   the factor related to the execution environment includes at least one of communication traffic, size of a communication buffer, and latency of communication, and
   the execution condition includes a rule considering at least one of memory amount, processing capacity and execution load installed in the high-order server or the machine tool.

* * * * *